(12) United States Patent
Chang et al.

(10) Patent No.: US 10,802,207 B2
(45) Date of Patent: Oct. 13, 2020

(54) BACKLIGHT MODULE

(71) Applicant: AU OPTRONICS CORPORATION, Hsin-Chu (TW)

(72) Inventors: Hao-Wei Chang, Hsin-Chu (TW); Shih-Wu Yuan, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/702,778

(22) Filed: Dec. 4, 2019

(65) Prior Publication Data

US 2020/0183071 A1 Jun. 11, 2020

Related U.S. Application Data

(60) Provisional application No. 62/775,480, filed on Dec. 5, 2018.

(30) Foreign Application Priority Data

Sep. 27, 2019 (TW) .............................. 108135122 A

(51) Int. Cl.
  *F21V 8/00* (2006.01)
(52) U.S. Cl.
  CPC .................................... *G02B 6/009* (2013.01)
(58) Field of Classification Search
  CPC ................................................... G02B 6/009
  See application file for complete search history.

(56) References Cited

U.S. PATENT DOCUMENTS

| 6,002,582 | A | * | 12/1999 | Yeager | .............. | G02F 1/133308 248/917 |
| 8,665,392 | B2 | | 3/2014 | Tang et al. | | |
| 9,482,812 | B2 | | 11/2016 | Que | | |
| 2008/0137272 | A1 | * | 6/2008 | Cheng | ............... | G02F 1/133308 361/679.01 |

(Continued)

FOREIGN PATENT DOCUMENTS

| CN | 104235698 A | 12/2014 |
| CN | 102692741 B | 9/2015 |

(Continued)

*Primary Examiner* — Thomas M Sember
(74) *Attorney, Agent, or Firm* — WPAT, PC

(57) ABSTRACT

The present invention provides a backlight module including a back bezel and a frame. The back bezel is provided with a wall disposed along a first side of the back bezel. The wall is provided with a first wall portion and a second wall portion alternately arranged along the first side, and the first wall portion and the second wall portion are each provided with an inner side surface and an outer side surface opposite to the inner side surface. In the backlight module, the inner side surface of the second wall portion protrudes toward the interior of the back bezel more than the inner side surface of the first wall portion. The frame extends at least partially along the first side and is positioned on the wall. The frame is provided with a first frame wall and a second frame wall alternately arranged and protruding toward a base of the wall. In the backlight module, the first frame wall correspondingly abuts against the inner side surface of the first wall portion, and the second frame wall correspondingly abuts against the outer side surface of the second wall portion.

11 Claims, 10 Drawing Sheets

(56) References Cited

U.S. PATENT DOCUMENTS

2008/0198627 A1\* 8/2008 Matsumoto .......... G02B 6/0088
362/633
2011/0128465 A1\* 6/2011 Park ........................ G09F 13/04
349/61

FOREIGN PATENT DOCUMENTS

| CN | 106990580 A | 7/2017 |
| CN | 206684439 U | 11/2017 |
| EP | 3217250 | 9/2017 |

\* cited by examiner

BACKLIGHT MODULE

BACKGROUND

Technical Field

The present invention relates to a backlight module. Specifically, the present invention relates to a backlight module having a back bezel and a frame.

Related Art

When a backlight module is assembled, a complicated process or manual operation may be required. Therefore, to reduce costs, simplify an assembly process, or use an automated manufacturing process, it is expected to simplify a component design of the backlight module. However, simplifying components of a backlight module, for example, omitting disposition of a U-type integrally formed iron piece, a hook, or a double faced adhesive tape, may lower the assembly precision of the backlight module. In addition, an optical effect defect or an appearance taste defect of an assembly completed product may be generated. Moreover, a simplified component design sometimes may require an additional welding process to assist in fixing different components. In this way, material characteristics of the components of the backlight module may be further limited, and reworkability of the backlight module is decreased, or damage caused by a careless operation in a welding process may be generated. In addition, if the assembly design of the backlight module is improper, an active region (for example, a light emitting region and a light mixing region of a display device) of an entire device may be further compressed. Therefore, it is necessary to consider the foregoing various factors when a corresponding assembly structure of a backlight module is designed.

SUMMARY

Technical Solutions to Resolve Problems

To resolve the foregoing problems, the present invention provides a backlight module including a back bezel and a frame. The back bezel is provided with a wall disposed along a first side of the back bezel. The wall is provided with a first wall portion and a second wall portion alternately arranged along the first side, and the first wall portion and the second wall portion are each provided with an inner side surface and an outer side surface opposite to the inner side surface. The inner side surface of the second wall portion protrudes toward the interior of the back bezel more than the inner side surface of the first wall portion. The frame extends at least partially along the first side and is positioned on the wall. The frame is provided with a first frame wall and a second frame wall alternately arranged and protruding toward a base of the wall. In the backlight module, the first frame wall correspondingly abuts against the inner side surface of the first wall portion, and the second frame wall correspondingly abuts against the outer side surface of the second wall portion.

Another embodiment of the present invention provides a backlight module including a back bezel and a frame. The back bezel is provided with a wall disposed along a first side of the back bezel. The wall is provided with an inner side surface and an outer side surface opposite to the inner side surface. The wall is provided with a plurality of first grooves recessed from the inner side surface and a plurality of second grooves recessed from the outer side surface that are alternately arranged along the first side. The frame extends at least partially along the first side and is positioned on the wall. The frame is provided with a first frame wall and a second frame wall alternately arranged and protruding toward a base of the wall. The first frame wall is correspondingly inserted into the first groove, and the second frame wall is correspondingly inserted into the second groove.

Still another embodiment of the present invention provides a backlight module including a back bezel and a frame. The back bezel is provided with a wall disposed along a first side of the back bezel. The wall is provided with a main wall portion and at least one inward concave wall portion connected to the main wall portion. The main wall portion and the at least one inward concave wall portion are provided with an inner side surface, an outer side surface opposite to the inner side surface, and a top surface. The inner side surface of the inward concave wall portion protrudes toward the interior of the back bezel more than the inner side surface of the main wall portion. The outer side surface of the main wall portion protrudes away from the interior of the back bezel more than the outer side surface of the inward concave wall portion. The frame extends at least partially along the first side and is positioned on the wall. The frame is provided with a top plate, and an inner frame wall and an outer frame wall both protruding toward a base of the wall from the top plate. At least a part of the top plate abuts against the top surface of the inward concave wall portion. The inner frame wall and the outer frame wall of the frame respectively abut against the inner side surface and the outer side surface of the inward concave wall portion.

Yet another embodiment of the present invention provides a backlight module including a back bezel and a frame. The back bezel is provided with a base plate, and a wall disposed along a first side of the back bezel. An upper part of the wall is provided with a fracture. A lower part of the wall corresponding to the fracture includes an inner wall, an outer wall, and a slot delimited by the inner wall and the outer wall. The wall at an end side of the fracture is provided with a channel in communication with the slot. The frame is provided with a limiting element configured to be capable of being inserted into the slot and moving along the slot to enter the channel, and a top plate frame body connected to at least a part of the limiting element. The top plate frame body is configured to abut against a top surface of the inner wall opposite to the base plate and to abut against a top surface of the outer wall opposite to the base plate.

Efficacy Compared with that of the Prior Art

According to the backlight modules provided in the embodiments of the present invention, assembly precision can be increased, and reworkability of the assembly completed backlight module can be improved while a structure of a back bezel and a frame of a backlight module is simplified. In addition, according to the backlight modules provided in the embodiments of the present invention, unexpected occupancy of a space in a backlight module in which other components are disposed can be reduced or avoided, thereby further improving accommodation performance of the backlight module.

DETAILED DESCRIPTION

Figure 1A:
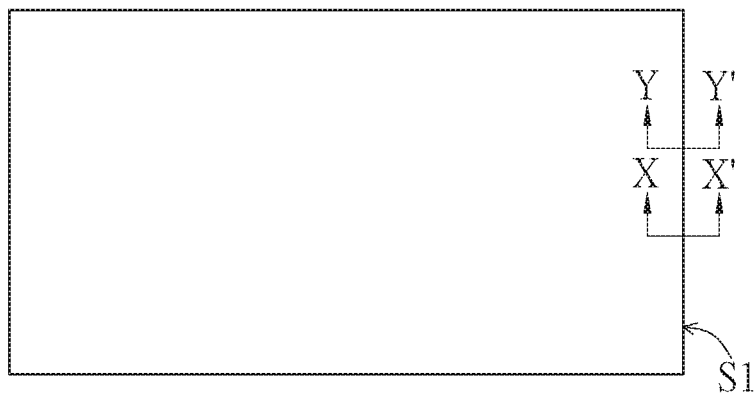
FIG. 1A is a simple schematic diagram of a backlight module according to an embodiment of the present invention.

Various embodiments are described below, and a person of ordinary skills in the technical field to which the present invention belongs shall readily understand the spirit and principles of the present invention with reference to the descriptions in conjunction with the accompanying drawings. However, although some specific embodiments are specifically described in the specification, the embodiments are merely used as examples, and are not considered as a limit or an exhaustive meanings in every aspect. Therefore, for a person of ordinary skills in the technical field to which the present invention belongs, various changes and modifications of the present invention should be apparent and readily implemented without departing from the spirit and principles of the present invention.

In the accompanying drawings, for clarity, thicknesses of a layer, a film, a plate, a region, and the like are enlarged. In the entire specification, a same element symbol represents a same element. It should be understood that, when an element such as a layer, a film, a region, or a substrate is referred as "on" another element or "connected to" another element, the element may be directly on another element or may be directly connected to another element, or an intermediate element may further exist. By contrast, when an element is referred as "directly on another element" or "directly connected to" another element, no intermediate elements exist.

As used in this specification, "connected" may refer to physically and/or electrically connected. In addition, "electrically connected" or "coupled" may refer to that another element may exist between two elements.

It should be understood that, terms "first", "second", "third", and the like in the specification may be used to describe various elements, components, regions, layers and/or parts, but the elements, components, regions, layers and/or parts should not be limited by the terms. The terms are only used to distinguish an element, component, region, layer, or part from another element, component, region, layer, or part. Therefore, a "first element", "first component", "first region", "first layer", or "first part" described below may be referred to as a second element, component, region, layer, or part without departing from teaching of the specification.

The terms used herein are merely intended to describe a particular embodiment rather than to limit the present invention as a particular embodiment. As used in the specification, unless indicated clearly in the content, a singular form "a", "one", or "the" intends to include a plural form, and include "at least one". "or" represents "and/or". As used in the specification, the term "and/or" includes any combination and all combinations of one or more related listed items. It should also be understood that, when used in the specification, the term "include" and/or "comprise" specifies existence or addition of a feature, a region, an entirety, a step, an operation, an element, and/or a component, but does not exclude existence or addition of one or more other features, regions, entireties, steps, operations, elements, components, and/or combinations thereof.

The following describes exemplary embodiments with reference to a sectional view used as a schematic diagram of an idealized embodiment. Therefore, a shape change from the shape shown in a figure due to a manufacturing technology and/or a tolerance can be expected. Therefore, the embodiments described in the specification shall not be explained as being limited to a particular shape of the region shown in the specification, but including, for example, a shape deviation caused by manufacturing. For example, a region shown or described as flat may generally have a characteristic of roughness and/or nonlinearity. In addition, a shown acute angle may be round. Therefore, a region shown in the figures is essentially exemplary, and a shape of the region is not intended to show a precise shape of the region, and is not intended to limit the application scope of the present invention.

Figure 1B:
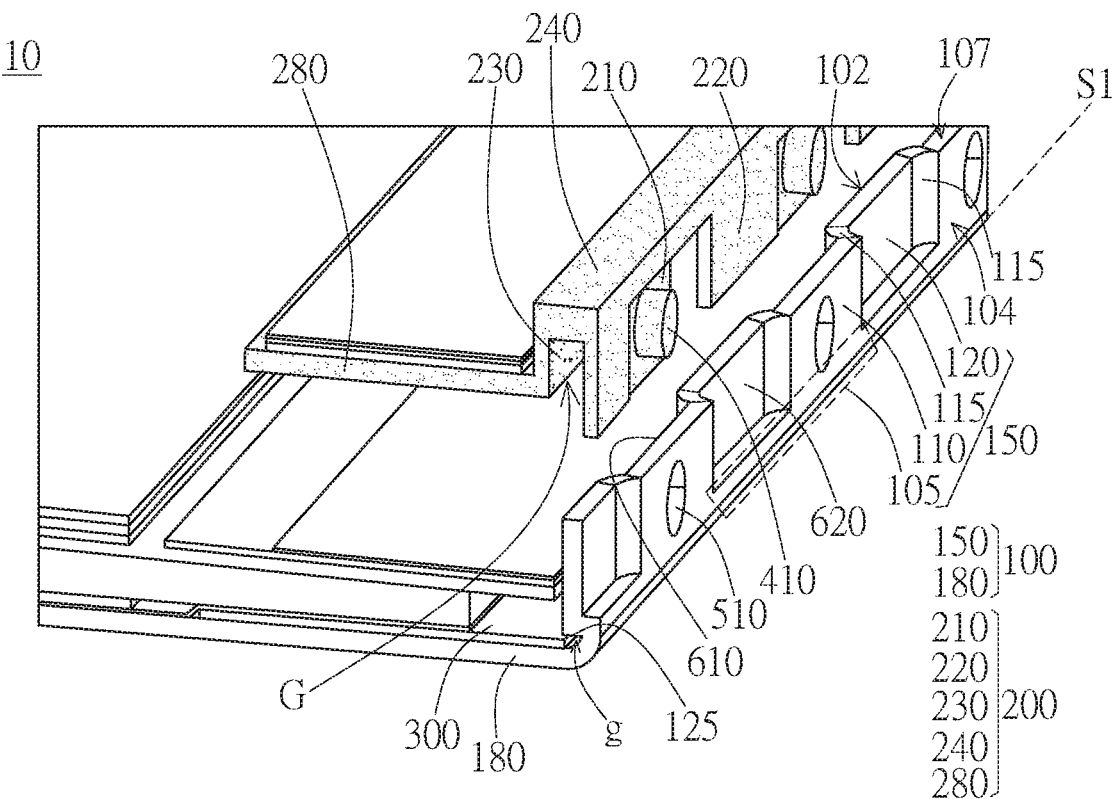
FIG. 1B is a three-dimensional diagram of a section of the backlight module in FIG. 1A taken along a section line X-X'.

Referring to FIG. 1A, a backlight module 10 according to an embodiment of the present invention may be provided with at least one side S1. As shown in FIG. 1B, the backlight module 10 taken along a section line X-X' in FIG. 1A may be provided with a back bezel 100 and a frame 200. The back bezel 100 and the frame 200 may be made of various conventional materials that can be used to manufacture a back bezel 100 and a frame 200, for example, metal and plastic, and the like. In addition, for ease of showing structures of the back bezel 100 and the frame 200, FIG. 1B shows an aspect in which the back bezel 100 and the frame 200 are not assembled.

Specifically, the back bezel 100 is at least provided with a wall 150 disposed along a first side S1 of the back bezel 100. Moreover, according to some embodiments, the back bezel 100 may also be provided with a base plate 180. The wall 150 protrudes from the base plate 180. According to the foregoing descriptions, the wall 150 is provided with a first wall portion 110 and a second wall portion 120 alternately arranged along the first side S1, and the first wall portion 110 and the second wall portion 120 are each provided with an inner side surface 102 and an outer side surface 104 opposite to the inner side surface 102. According to this embodiment, the inner side surface 102 of the second wall portion 120 protrudes toward the interior of the back bezel 100 more than the inner side surface 102 of the first wall portion 110. The outer side surface 104 of the first wall portion 110 of the back bezel 100 protrudes away from the interior of the back bezel 100 more than the outer side surface 104 of the second wall portion 120. For example, the wall 150 may be formed as a structure in which concavities and convexities are alternately arranged along the first side S1, such as a meandering serpentine structure, a serrated serpentine structure, or a structure in which the first wall portions 110 and the second wall portions 120 of which relative distances to a center of the back bezel 100 are different are connected to each other or individually and separately arranged without connection along the first side S1. For example, according to this embodiment, the wall 150 is formed as the structure in which the first wall portions 110 and the second wall portions 120 of which relative distances to a center of the back bezel 100 are different are distributed and connected to each other along the first side S1. In detail, the wall 150 may be further provided with a connection portion 115. The connection portion 115 is connected between the first wall portion 110 and the second wall portion 120.

According to some embodiments, as shown in FIG. 1B, the wall 150 may be provided with a plurality of first grooves 610 recessed from the inner side surface 102 and a plurality of second grooves 620 recessed from the outer side surface 104 that are alternately arranged along the first side S1. For example, the connection portion 115 is connected to the first wall portion 110 that is relatively convex away from the interior of the back bezel 100, thereby forming the first groove 610 recessed relative to the inner side surface 102. Similarly, the connection portion 115 is connected to the second wall portion 120 that is relatively recessed toward the interior of the back bezel 100, thereby forming the second groove 620 recessed relative to the outer side surface 104.

Figure 2:
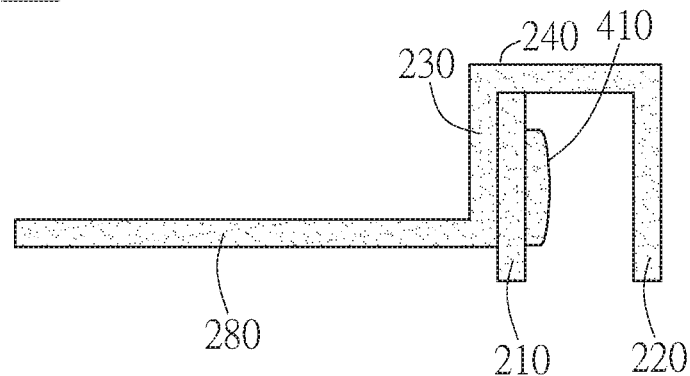
FIG. 2 is a schematic sectional view of a frame according to an embodiment of the present invention.

According to the foregoing descriptions, the backlight module 10 further includes the frame 200 corresponding to the wall 150. The frame 200 is configured to at least partially extend along the first side S1 and be positioned on the wall 150. Specifically, referring to FIG. 1B and FIG. 2 which is a schematic sectional view showing the frame 200, the frame 200 may be provided with a first frame wall 210 and a second frame wall 220 that are alternately arranged and protrude toward a base 105 of the wall 150. The first frame wall 210 is relatively close to the interior of the back bezel 100. The second frame wall 220 is relatively far away from the interior of the back bezel 100. Therefore, further referring to FIG. 3A taken along the section line X-X' in FIG. 1A and FIG. 3B taken along a section line Y-Y' in FIG. 1A (FIG. 3B may also be viewed as a figure taken along a section line A-A' in FIG. 3A), when the frame 200 is positioned and assembled on the back bezel 100, the first frame wall 210 correspondingly abuts against the inner side surface 102 of the first wall portion 110, and the second frame wall 220 correspondingly abuts against the outer side surface 104 of the second wall portion 120. In other words, the first frame wall 210 may correspondingly be guided along the first groove 610 and inserted into the first groove 610, and the second frame wall 220 may correspondingly be guided along the second groove 620 and inserted into the second groove 620.

In detail, referring to FIG. 1B to FIG. 3B, the frame 200 may be provided with a top plate 240 covering at least a part of a top surface 107 of the wall 150. The first frame wall 210 and the second frame wall 220 each protrude toward the base 105 of the wall 150 from the top plate 240. Through this configuration, when the frame 200 is positioned and assembled on the back bezel 100, the top plate 240 of the frame 200 abuts against the at least a part of the top surface 107 of the wall 150. The first frame wall 210 protruding downward from the top plate 240 at a position relatively close to the interior of the back bezel 100, and the second frame wall 220 protruding downward from the top plate 240 at a position relatively far away from the interior of the back bezel 100 respectively extend along the inner side surface 102 and the outer side surface 104 of the wall 100. In this way, the first frame wall 210 is accommodated in a space delimited by the first wall portion 110 and the connection portion 115 on the inner side surface 102 of the first wall portion 110. The second frame wall 220 is accommodated in a space delimited by the second wall portion 120 and the connection portion 115 on the outer side surface 104 of the second wall portion 120.

According to some embodiments, as shown in FIG. 1B to FIG. 3B, the base 105 of the wall 150 of the back bezel 100 of the backlight module 10 may not be divided into different segments similar to the first wall portion 110 and the second wall portion 120. In this case, the first wall portion 110 and the second wall portion 120 may be wall-shaped structures relatively far away from the interior of the back bezel 100 and relatively close to the interior of the back bezel 100 that protrude upward from the base 105 respectively. However, the foregoing descriptions are only examples, and the present invention is not limited thereto.

Further, according to some embodiments, one of the first frame wall 210 and the first wall portion 110 is provided with a first bump 410 protruding toward the other one of the first frame wall 210 and the first wall portion 110. The other one of the first frame wall 210 and the first wall portion 110 is provided with a first hole 510 corresponding to the first bump 410. In this way, when the first frame wall 210 correspondingly abuts against the inner side surface 102 of the first wall portion 110, the first bump 410 may protrude through the first hole 510. Therefore, the frame 200 is more firmly positioned on the wall 150. For example, as shown in FIG. 1B to FIG. 3B, the first frame wall 210 is provided with the first bump 410, and the first wall portion 110 is provided with the first hole 510. When the first frame wall 210 correspondingly abuts against the inner side surface 102 of the first wall portion 110, the first bump 410 of the first frame wall 210 may protrude through the first hole 510 of the first wall portion 110, and thereby clamping and fastening the frame 200 and the back bezel 100. However, the foregoing descriptions are only examples. For example, according to another embodiment, one of the second frame wall 220 and the second wall portion 120 is provided with a second bump protruding toward the other one of the second frame wall 220 and the second wall portion 120. The other one of the second frame wall 220 and the second wall portion 120 is provided with a second hole corresponding to the second bump. Alternatively, the first frame wall 210 and the first wall portion 110 may be respectively formed with positioning structures matched with each other, or the second frame wall 220 and the second wall portion 120 may be respectively formed with positioning structures matched with each other. The structures configured to assist in positioning or clamping and fastening in the present invention are not limited thereto.

Figure 3A:
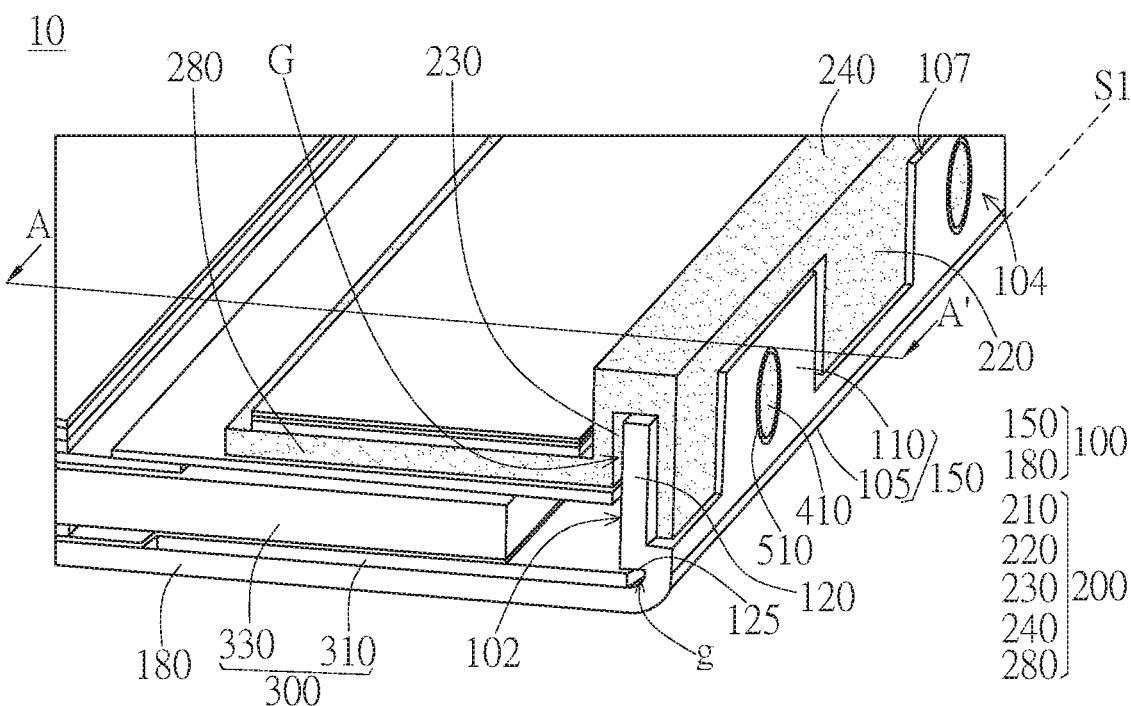
FIG. 3A is an enlarged three-dimensional sectional diagram of the backlight module in an assembled state in FIG. 1B.
Figure 3B:
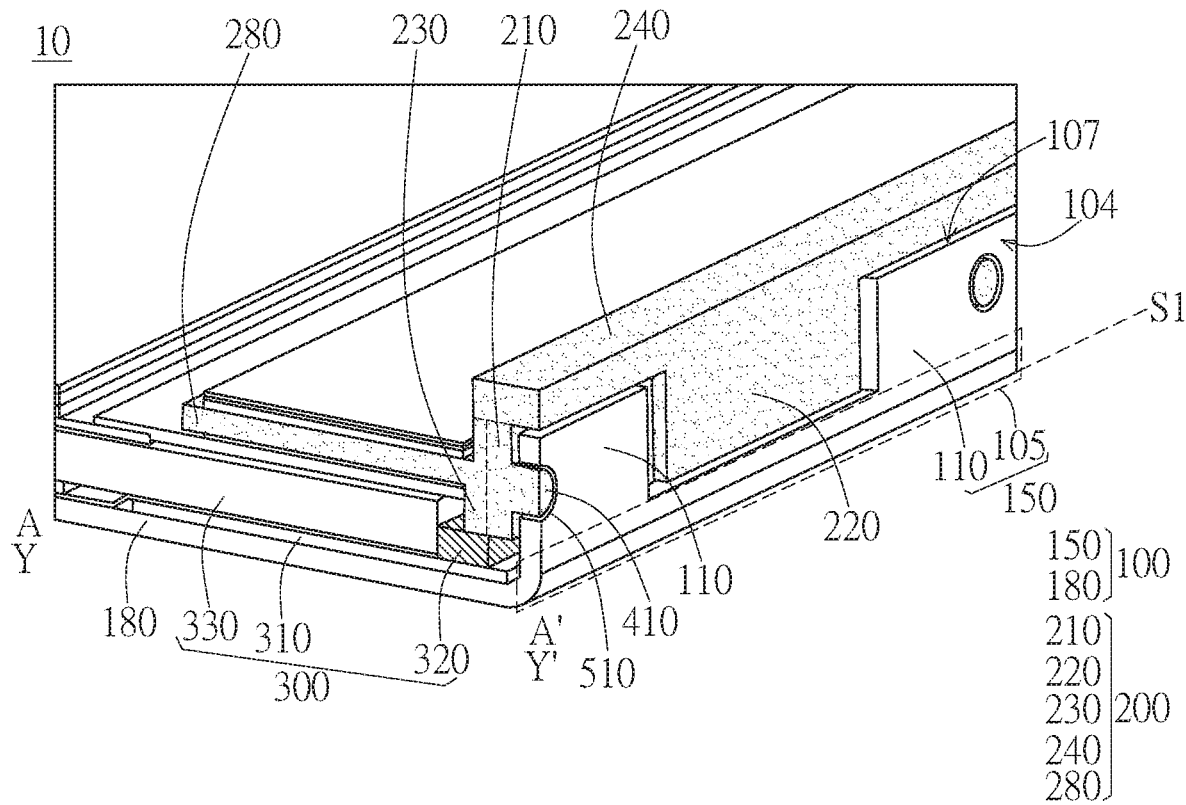
FIG. 3B is a three-dimensional diagram of a section of the backlight module in FIG. 1A in an assembled state taken along a section line Y-Y'.
Figure 3C:
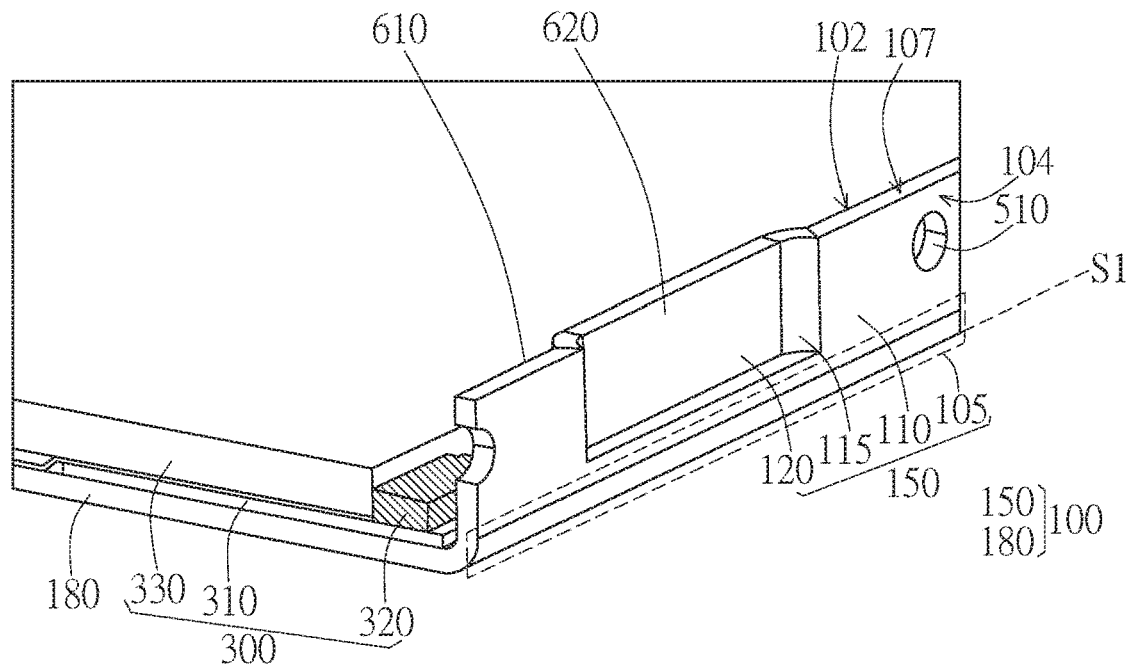
FIG. 3C is a schematic three-dimensional diagram of the backlight module in FIG. 3B in which only a back bezel and a light source module are shown.

In addition, according to this embodiment, besides the back bezel 100 and the frame 200, the backlight module 10 may further include another portion or component. For example, as shown in FIG. 3A and FIG. 3B, the backlight module 10 may further include a light source module 300. Specifically, the light source module 300 is disposed on the base plate 180 of the back bezel 100 along the first side S1 at the side of the inner side surface 102 of the first wall portion 110 and the inner side surface 102 of the second wall portion 120.

Specifically, the light source module 300 may be, for example, provided with components such as a circuit substrate 310, a light emitting element 320, and a light guide plate 330. As shown in FIG. 3A, according to this embodiment, a gap g exists between a lower end edge 125 of the second wall portion 120 protruding upward from the base 105 of the wall 150 and the base plate 180. According to the foregoing descriptions, at least a part of the circuit substrate 310 of the light source module 300 extends into the gap g. In detail, based on the structure design of the back bezel 100 and the frame 200 in this embodiment of the present invention, the at least a part of the circuit substrate 310 is accommodated in the gap g when the back bezel 100 and the frame 200 are in an assembled state. According to the foregoing descriptions, based on the design of the corresponding assembly structure in this embodiment, when the back bezel 100 and the frame 200 are assembled, unexpected occupancy of or interference in a space in the backlight module 10 in which another portion or component is disposed can be reduced or avoided, thereby improving accommodation performance of the entire backlight module 10.

Figure 4:
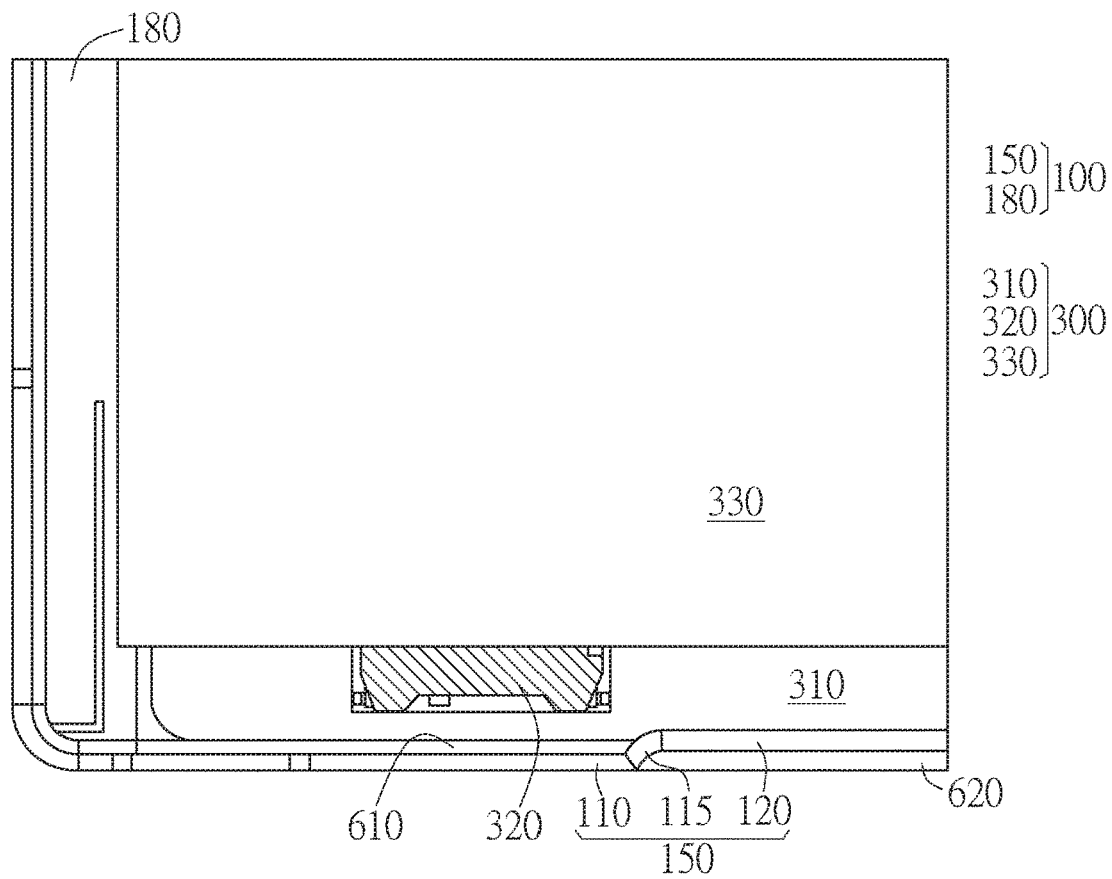
FIG. 4 is a detailed top view of the backlight module in FIG. 3C.

In addition, according to this embodiment, the light emitting element 320 of the light source module 300 may be disposed corresponding to the first wall portion 110. For example, referring to FIG. 3B, FIG. 3C which corresponds to FIG. 3B in which the frame 200 and other portions on the frame 200 are omitted, and FIG. 4 which is a plane top view corresponding to the backlight module 10 in FIG. 3C in which the frame 200 and other portions on the frame 200 are omitted, when the light emitting element 320 of the light source module 300 is orthogonally projected on the wall 150, the light emitting element 320 may at least overlap a part of the base 105 of the wall 150 corresponding to the first wall portion 110. In detail, because the second wall portion 120 is close to the interior of the back bezel 100 more than the first wall portion 110, and the first wall portion 110 is far away from the interior of the back bezel 100 more than the second wall portion 120, the first wall portion 110 is provided with a relatively large space to dispose various portions or components at the inner side surface 102. In addition, according to this embodiment, even if the assembly is completed, the first frame wall 210 of the frame 200 does not protrude to abut against the base plate 180. Therefore, a lower side along the inner side surface 102 of the first wall portion 110 has a larger accommodation space than that of a lower side along the inner side surface 102 of the second wall portion 120. Therefore, the light emitting element 320 may be disposed on the side of the inner side surface 102 of the wall 150 corresponding to the first wall portion 110. The light emitting element 320 is disposed lower than the first frame wall 210 to avoid interference. According to the foregoing descriptions, through the structure and the configuration, accommodation performance of the entire backlight module 10 is further improved.

In addition to the circuit substrate 310, the light emitting element 320, and the light guide plate 330, the light source module 300 may also include other conventional or future developed portions or components such as an optical film, a reflector sheet, and an optical structure, which will not be described in detail herein. Moreover, in addition to the back bezel 100, the frame 200, and the light source module 300, the backlight module 10 according to the present invention may also further include another structure or module, which will not be described in detail in this specification. That is, the back bezel 100 and the frame 200 of the backlight module 10 in the present invention are applicable and applied to combine with various structures and modules, and are not limited to the aspects specifically shown in the figures and this specification.

When the backlight module 10 is provided with the light source module 300, the frame 200 may further include a light shielding plate 280 extending and protruding toward the interior of the back bezel 100. According to the foregoing descriptions, when the light shielding plate 280 is orthogonally projected on the base plate 180, the light shielding plate 280 overlaps at least a part of the light source module 300. In this way, light emitted by a light source, such as the light emitting element 320, of the light source module 300 can be prevented from unexpected leakage or emission.

In some embodiments, in addition to the first frame wall 210 and the second frame wall 220, the frame 200 may be further provided with the top plate 240 covering at least a part of the top surface 107 of the wall 150, and a main frame wall 230 close to the interior of the back bezel 100 more than the first frame wall 210 and the second frame wall 220. According to the foregoing descriptions, the main frame wall 230, the first frame wall 210 and the second frame wall 220 each protrude toward the base 105 of the wall 150 from the top plate 240. In this embodiment, as shown in FIG. 1B and FIG. 3A, the main frame wall 230, the top plate 240, and the second frame wall 220 may delimit a trench G together. The second wall portion 120 is inserted into the trench G, so that the second wall portion 120 is sleeved with the main frame wall 230, the top plate 240, and the second frame wall 220.

Referring to FIG. 3B, according to this embodiment, the main frame wall 230 and the first frame wall 210 may be connected to each other. However, according to another embodiment of the present invention, the main frame wall 230 and the first frame wall 210 may alternatively be separated from each other as plate elements not interconnected, and the present invention is not limited thereto.

In various embodiments, the light shielding plate 280 may protrude toward the interior of the back bezel 100 opposite to the top plate 240. For example, as shown in FIG. 1B to FIG. 3B, the light shielding plate 280 is separated from the top plate 240 and protrudes toward the interior of the back bezel 100 opposite to the top plate 240 from the main frame wall 230. However, according to another embodiment, the light shielding plate 280 may be substantially a block of the top plate 240 extending toward the interior of the back bezel 100. That is, in another embodiment, the light shielding plate 280 may be substantially a part of a same plate element as the top plate 240, and the present invention is not limited thereto.

According to the foregoing embodiments, the backlight module 10 is relatively easily disassembled. For example, the first bump 410 exposed from the side of the outer side surface 104 can be pressed, so that the first bump 410 is detached from the first hole 510. Then the frame 200 is moved upward, so that the frame 200 is disassembled from the wall 150 of the back bezel 100 without damaging the back bezel 100 or the frame 200. For example, because an operation such as welding is not used when the back bezel 100 and the frame 200 are assembled, the back bezel 100 and the frame 200 are not fused together, and the back bezel 100 and the frame 200 are relatively easily disassembled without damaging the back bezel 100 and the frame 200. According to the foregoing descriptions, the back bezel 100 and the frame 200 may be disassembled and assembled repeatedly according to this embodiment while assembly precision and convenience is improved. Therefore, according to this embodiment, the back bezel 100 and the frame 200 of the backlight module 10 may be simplified. A process of assembling the back bezel 100 and the frame 200 of the backlight module 10 is simplified (for example, reducing hot melt welding operations), and precision of assembling the backlight module 10 is improved. Also, reworkability of the backlight module 10 is improved, thereby improving quality of assembling the backlight module 10 and reducing costs of manufacturing and reworking.

Further, due to a smaller accommodation space of the backlight module 10 is occupied, the light source module 300 can be more evenly disposed in the backlight module 10. Therefore, optical taste of the entire backlight module 10 may be further improved, and optical defects that may be generated at an assembly border between the back bezel 100 and the frame 200 are reduced according to this embodiment. For example, the area of a light mixing region or an active light emitting region may be improved. In addition, due to simplified components, a simplified assembly process, and a characteristic of straight up and down assembly movements, the backlight module 10 according to this embodiment may also be assembled through an automated manufacturing process.

Figure 5:
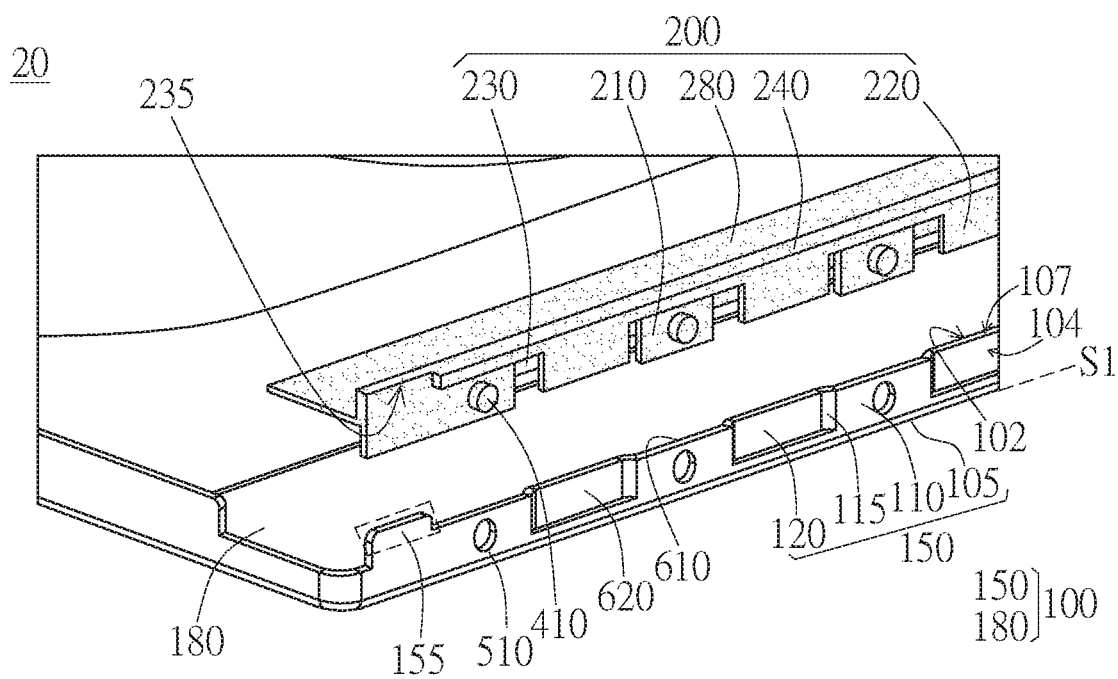
FIG. 5 is a schematic three-dimensional diagram of a backlight module that is not assembled completely according to another embodiment of the present invention.

Next, referring to FIG. 5, in a backlight module 20 according to another embodiment of the present invention, to align and assemble a back bezel 100 and a frame 200, a top plate 240 is provided with a notch 235 along an end edge of an end of a first side S1. A wall 150 is additionally provided with an alignment protrusion portion 155 that protrudes toward the notch 235 to correspond to the notch 235. The alignment protrusion portion 155 is aligned with and disposed in the notch 235. In this way, the alignment protrusion portion 155 can assist in aligning the back bezel 100 and the frame 200 at the beginning of the assembly, and further firm an assembly structure of the back bezel 100 and the frame 200 after the assembly is completed. However, according to various embodiments of the present invention, an auxiliary structure used for alignment and positioning is not limited to this example.

Figure 6:
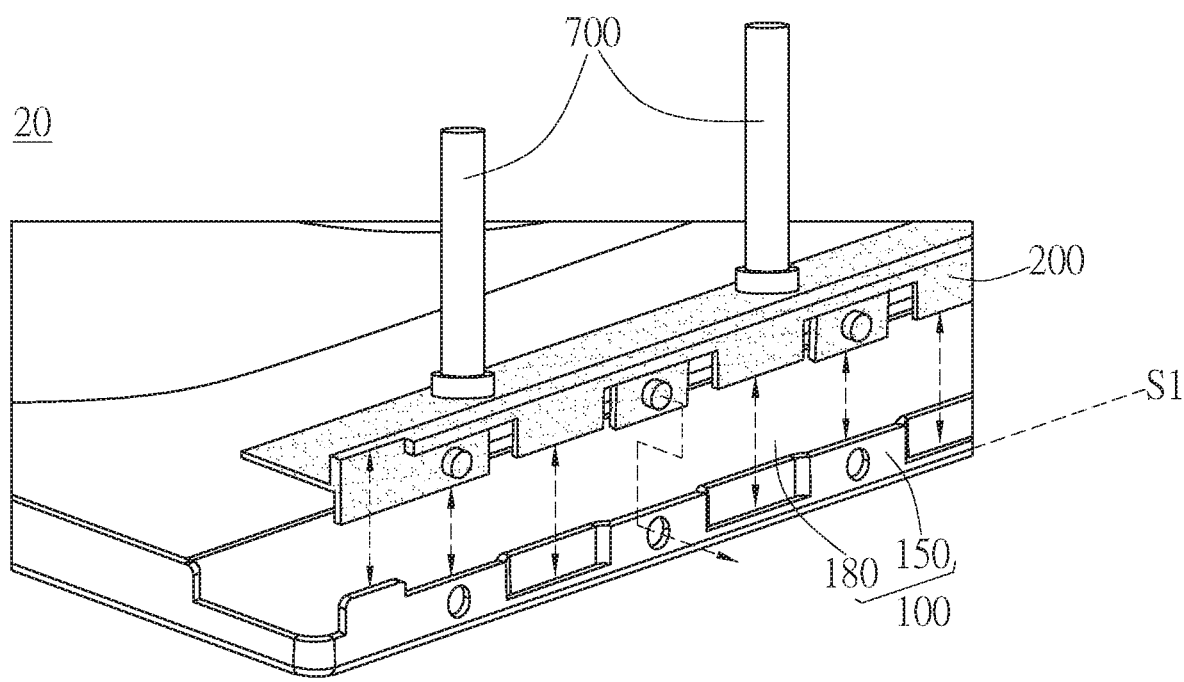
FIG. 6 is a schematic diagram of assembling a back bezel and a frame of a backlight module according to an embodiment of the present invention.

Referring to FIG. 6, according to some embodiments, the frame 200 shown in FIG. 5 may be held and moved by using any applicable tool 700 such as a fixture or a sucker, and aligned with the wall 150 of the back bezel 100. According to the foregoing descriptions, the frame 200 may move in a straight manner along a direction indicated by a dashed double-headed arrow shown in the figure (for example, straight up and down), and is positioned and even clamped and fastened on the wall 150 through corresponding structures of the wall 150 and the frame 200, thereby completing assembly of the backlight module 20.

Figure 7A:
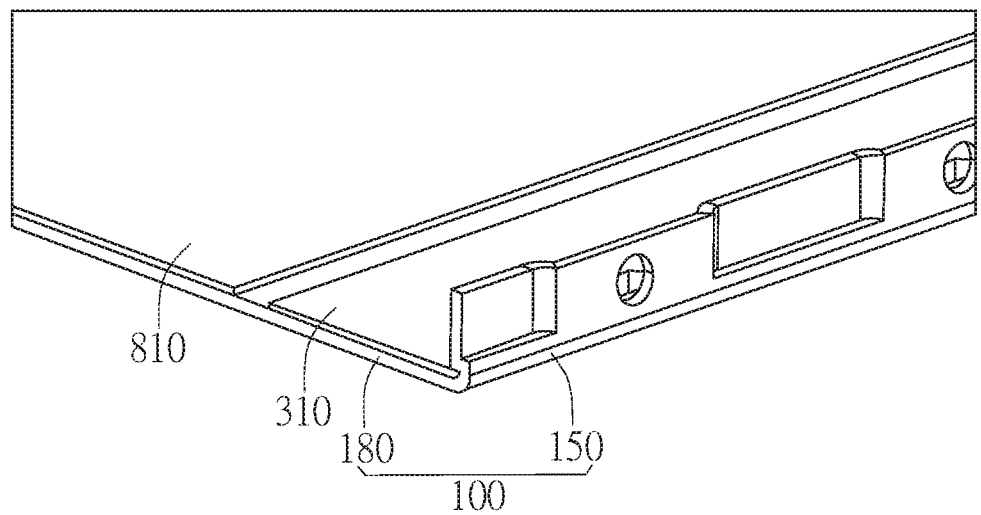
FIG. 7A to FIG. 7D are schematic diagrams of a sequence of assembling a backlight module according to still another embodiment of the present invention.
Figure 7B:
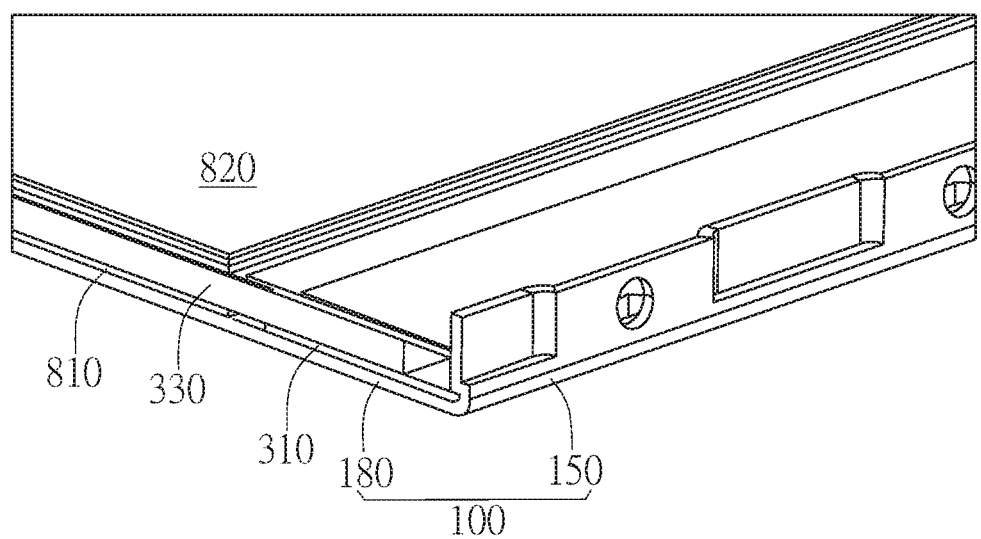
Figure 7C:
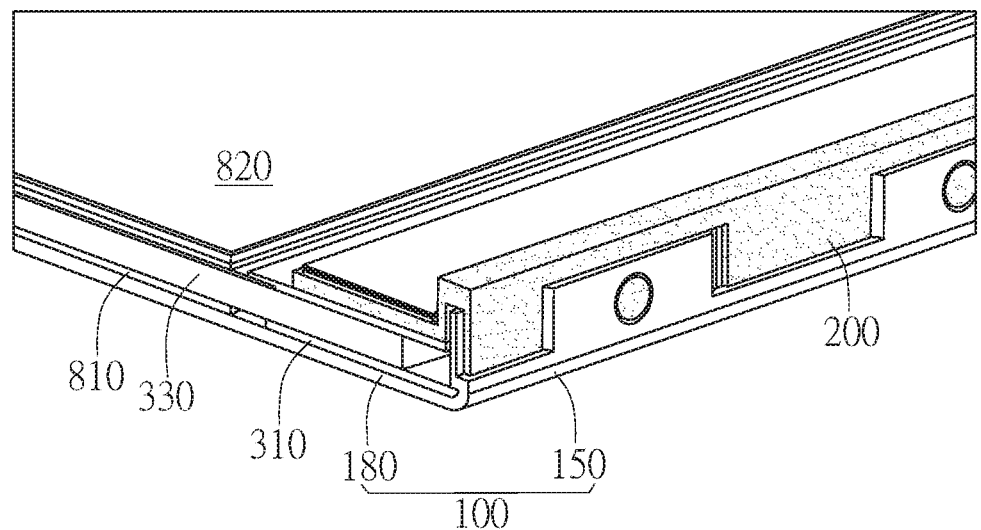
Figure 7D:
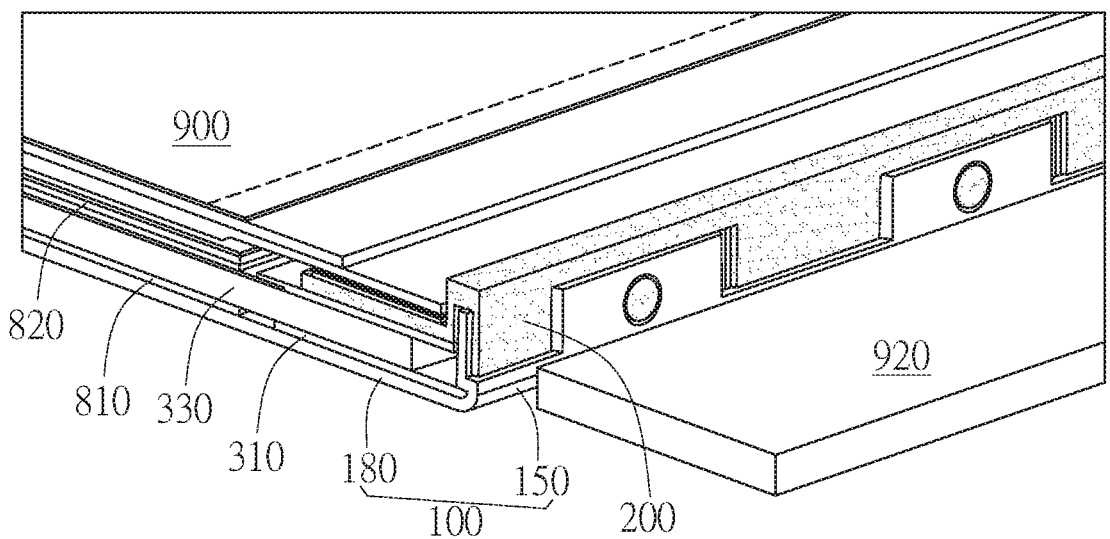

In the following, a process of assembling a backlight module 30 according to an embodiment of the present invention will be described with reference to FIG. 7A to FIG. 7D. Specifically, referring to FIG. 7A, a back bezel 100 may be first prepared, and a circuit substrate 310, a light emitting element (not shown in FIG. 7A), and a reflector sheet 810 are disposed on the back bezel 100. Then, as shown in FIG. 7B, components such as a light guide plate 330 and an optical film 820 may be further disposed on the circuit substrate 310 and the reflector sheet 810. After that, in FIG. 7C, similar to the process described with reference to FIG. 6, a frame 200 (and other components that may be disposed on the frame 200) corresponding to a wall 150 is assembled and positioned on the wall 150. Finally, referring to FIG. 7D, for example, a display module 900 is disposed on the frame 200. Various portions and components including, for example, a PCBA 920 are disposed to complete assembly of the backlight module 30.

The process and details of assembling the backlight module 30 described with reference to FIG. 7A to FIG. 7D are merely examples. A person of ordinary skills in the technical field to which the present invention belongs should understand through the examples that the designs according to the present invention can be applied to designs and assembly of various backlight modules.

Hereinafter, an aspect of another embodiment of a backlight module falling within the principle of the present invention will be further described with reference to FIG. 8 to FIG. 13.

Figure 8:
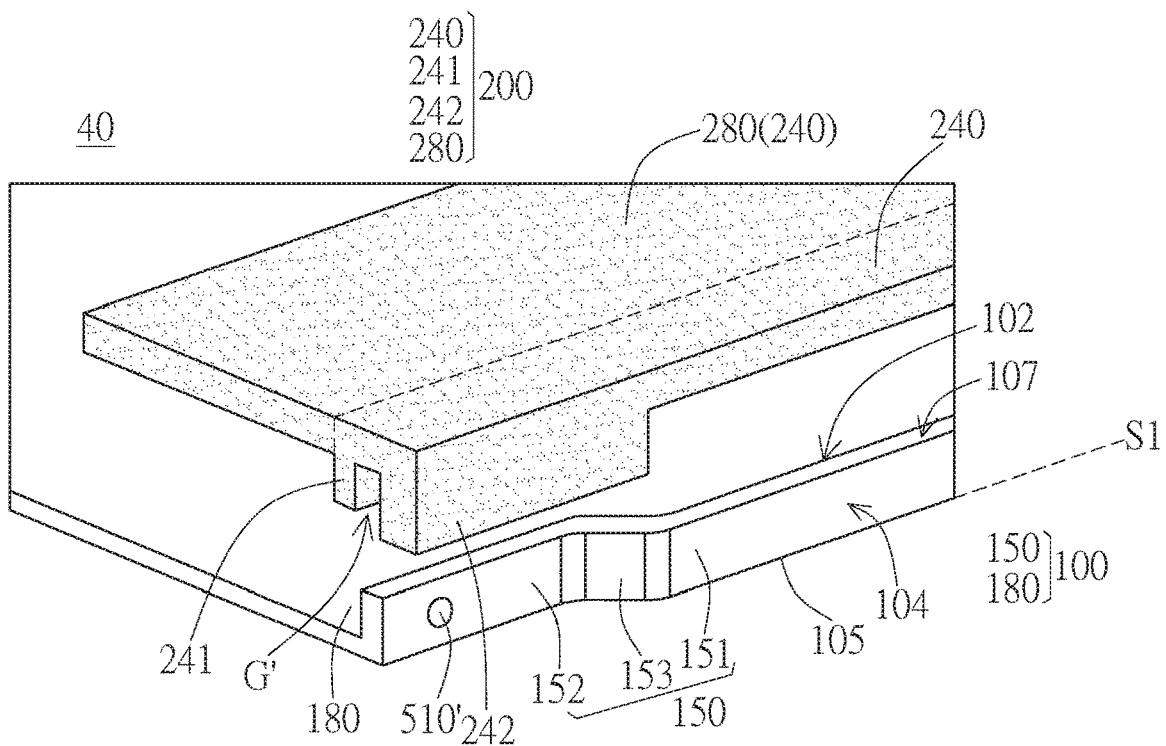
FIG. 8 is a schematic three-dimensional diagram of a backlight module that is not assembled completely according to yet another embodiment of the present invention.
Figure 9A:
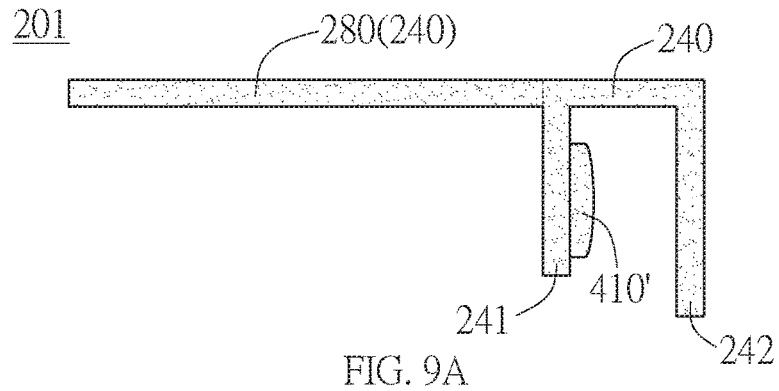
FIG. 9A and FIG. 9B are schematic diagrams of frames according to embodiments.
Figure 9B:
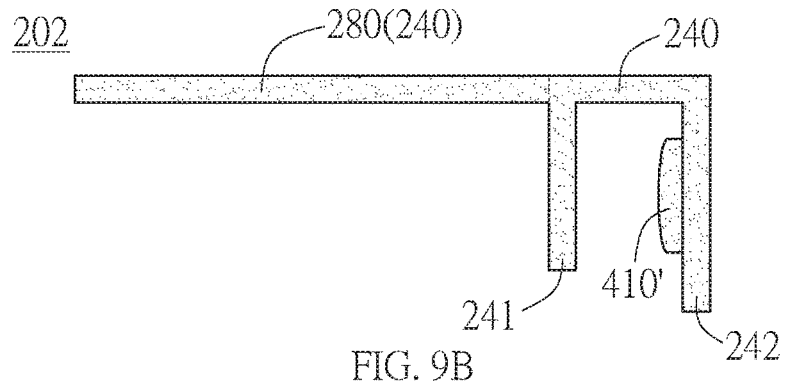

For example, according to an embodiment of the present invention, referring to FIG. 8, a backlight module 40 may include a back bezel 100 and a frame 200. Similar to the backlight module 10 described with reference to FIG. 1B to FIG. 3B, the back bezel 100 is provided with a wall 150 disposed along a first side S1 of the back bezel 100. As described above, different from the foregoing backlight module 10, the wall 150 may be provided with a main wall portion 151 and at least one inward concave wall portion 152 connected to the main wall portion 151. In addition, in some embodiments, the wall 150 may be provided with a connection portion 153 connecting the main wall portion 151 and the inward concave wall portion 152.

According to the foregoing descriptions, the main wall portion 151 and the at least one inward concave wall portion 152 are provided with an inner side surface 102, an outer side surface 104 opposite to the inner side surface 102, and a top surface 107. The inner side surface 102 of the inward concave wall portion 152 protrudes toward the interior of the back bezel 100 more than the inner side surface 102 of the main wall portion 151. The outer side surface 104 of the main wall portion 151 protrudes away from the interior of the back bezel 100 more than the outer side surface 104 of the inward concave wall portion 152.

Similarly, the backlight module 40 according to this embodiment is also provided with the frame 200 that extends at least partially along the first side S1 and is positioned on the wall 150. The frame 200 is provided with a top plate 240, an inner frame wall 241 and an outer frame wall 242 protruding toward a base 105 of the wall 150 from the top plate 240. When the frame 200 is positioned and assembled on the wall 150, at least a part of the top plate 240 may abut against the top surface 107 of the inward concave wall portion 152 and/or the main wall portion 151. The inner frame wall 241 and the outer frame wall 242 of the frame 200 may respectively abut against the inner side surface 102 and the outer side surface 104 of the inward concave wall portion 152. In detail, when the frame is not assembled, the top plate 240, the inner frame wall 241, and the outer frame wall 242 of the frame 200 may delimit a trench G' together. According to the foregoing descriptions, when the frame 200 is positioned and assembled on the wall 150, the inward concave wall portion 152 may be inserted into the trench G', so that the inward concave wall portion 152 is sleeved with the top plate 240, the inner frame wall 241, and the outer frame wall 242.

According to this embodiment, the backlight module 40 may be provided with various correspondingly matched structures, so as to improve precision and stability of positioning the frame 200 on the wall 150. For example, referring to a frame 201 of an aspect shown in FIG. 9A in conjunction with FIG. 8, one of the inward concave wall portion 152 and the inner frame wall 241 is provided with a bump 410' protruding toward the other one of the inward concave wall portion 152 and the inner frame wall 241, and the other one of the inward concave wall portion 152 and the inner frame wall 241 is provided with a hole 510' corresponding to the bump 410'. For example, the inner frame wall 241 may be provided with the bump 410', and the inward concave wall portion 152 may be provided with the hole 510'. In this way, when the inner frame wall 241 abuts against the inner side surface 102 of the inward concave wall portion 152, the bump 410' may protrude through the hole 510'. Alternatively, referring to a frame 202 of an aspect shown in FIG. 9B in conjunction with FIG. 8, one of the inward concave wall portion 152 and the outer frame wall 242 is provided with a bump 410' protruding toward the other one of the inward concave wall portion 152 and the outer frame wall 242, and the other one of the inward concave wall portion 152 and the outer frame wall 242 is provided with an hole 510' corresponding to the bump 410'. For example, the outer frame wall 242 may be provided with the bump 410', and the inward concave wall portion 152 may be provided with the hole 510'. In this way, when the outer frame wall 242 abuts against the outer side surface 104 of the inward concave wall portion 152, the bump 410' may protrude through the hole 510'. According to the foregoing descriptions, through matching between the bump 410' and the hole 510', the frame 200 is more firmly and precisely positioned on the back bezel 100. However, the foregoing is merely an example, and a corresponding structure configured to assist in positioning the frame 200 on the back bezel 100 according to various embodiments of the present invention is not limited thereto.

According to some embodiments of the present invention, similar to the foregoing backlight module 10, the backlight module 40 may further include the light source module 300. Specifically, the back bezel 100 of the backlight module 40 is provided with the base plate 180. The wall 150 may protrude from the base plate 180. The light source module 300 is disposed on the base plate 180 along the first side S1 at the side of the inner side surface 102 of the main wall portion 151 that is relatively far away from the interior of the back bezel 100. The disposition is similar to that of the foregoing embodiments or has a same principle as that of the foregoing embodiments, and will not be described and shown in detail herein.

In addition, in a case that the light source module 300 is disposed, the top plate 240 of the frame 200 of the backlight module 40 may extend and protrude toward the interior of the back bezel 100 to serve as a light shielding plate. In detail, the top plate 240 connecting the inner frame wall 241 and the outer frame wall 242 may integrally protrude and extend above the light source module 300, so that when the top plate 240 is orthogonally projected on the base plate 180, the top plate 240 overlaps at least a part of the light source module 300. However, the foregoing is merely an example. The present invention is not limited thereto, and the aspect shown herein is merely an example. For example, according to another embodiment, the frame 200 of the backlight module 40 may also be additionally provided with a light shielding plate that extends and protrudes toward the interior of the back bezel 100 and is separated from the top plate 240 or is not on the same plane as the top plate 240.

Figure 10:
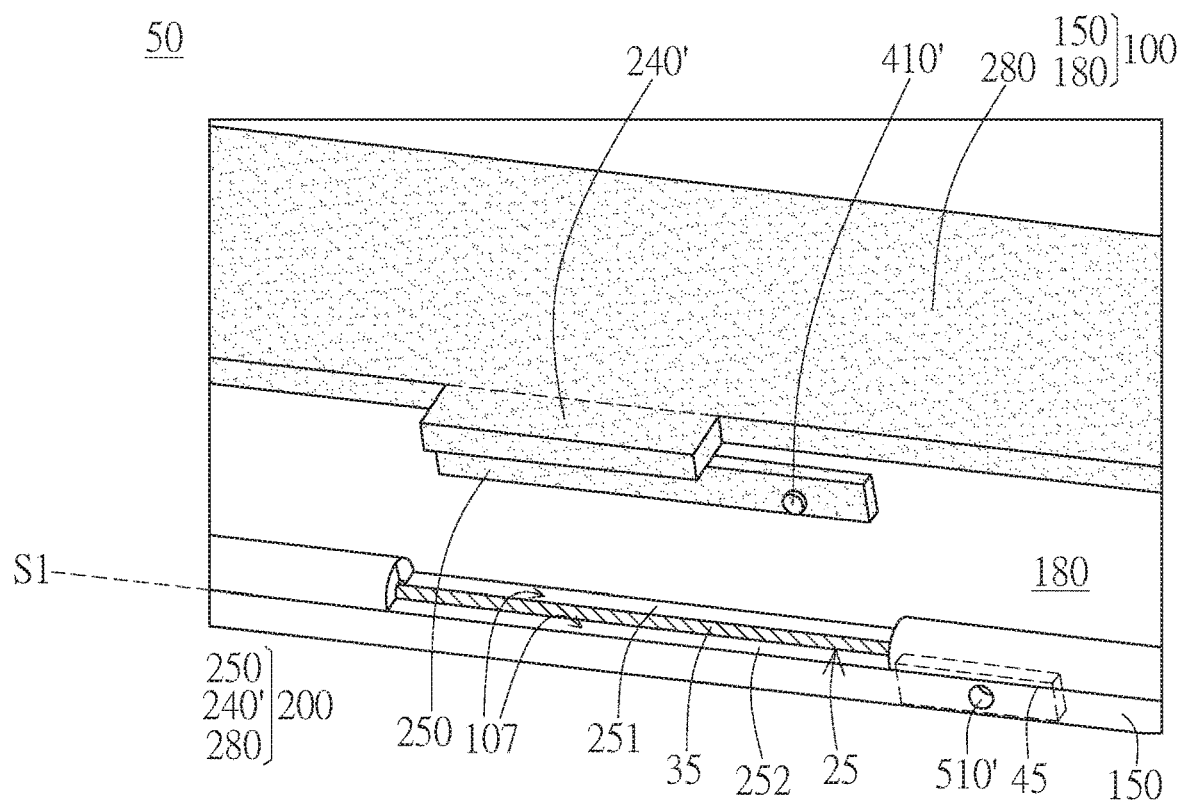
FIG. 10 is a schematic three-dimensional diagram of a backlight module that is not assembled completely according to another embodiment of the present invention.

Next, referring to FIG. 10, according to another embodiment of the present invention, a backlight module 50 may include a back bezel 100 provided with a base plate 180 and a wall 150, and a frame 200. Similar to the backlight module 10 described with reference to FIG. 1B to FIG. 3B, the wall 150 is disposed along a first side S1 of the back bezel 100. However, different from the backlight module 10 described in the foregoing, an upper part of the wall 150 of the backlight module 50 according to this embodiment is provided with a fracture 25. A lower part of the wall 150 corresponding to the fracture 25 includes an inner wall 251, an outer wall 252, and a slot 35 delimited by the inner wall 251 and the outer wall 252. In addition, the wall 150 at an end side of the fracture 25 is provided with a channel 45 in communication with the slot 35, and the wall 150 at another opposite end side may be solid and truncate the slot 35.

Figure 11:
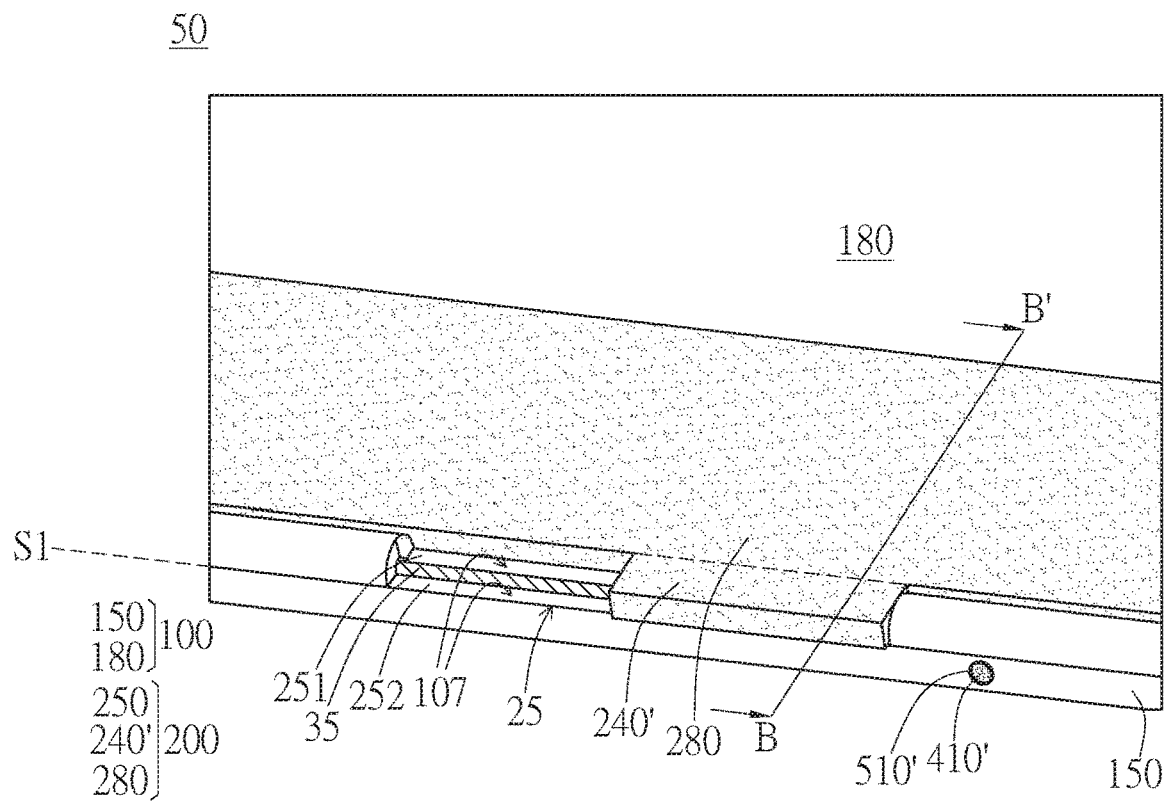
FIG. 11 is a schematic three-dimensional diagram of a backlight module in an assembled state according to another embodiment of the present invention.
Figure 12:
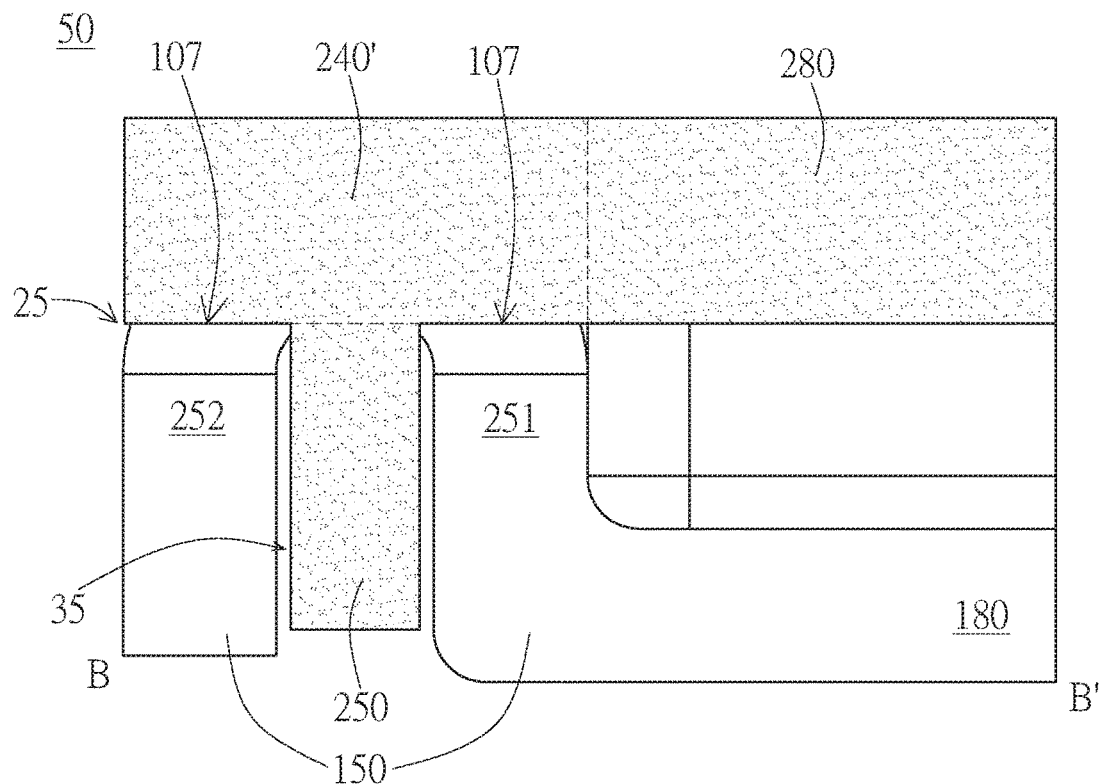
FIG. 12 is a schematic sectional view of the backlight module in FIG. 11.

According to the foregoing descriptions, referring to FIG. 11 and FIG. 12 taken along a section line B-B' in FIG. 11 in conjunction with FIG. 10, the frame 200 of the backlight module 50 according to this embodiment is provided with a limiting element 250 configured to be capable of being inserted into the slot 35 and moving along the slot 35 to enter the channel 45, and a top plate frame body 240' connected to at least a part of the limiting element 250. As shown in FIG. 11, when the frame 200 and the wall 150 are assembled, the top plate frame body 240' is configured to abut against the top surface 107 of the inner wall 251 opposite to the base plate 180 and abut against the top surface 107 of the outer wall 252 opposite to the base plate 180.

According to this embodiment, the backlight module 50 may be provided with various correspondingly matched structures, so as to improve precision and stability of positioning the frame 200 on the wall 150. For example, referring to FIG. 10 and FIG. 11, the limiting element 250 may be provided with the bump 410', and the wall 150 is provided with the hole 510' at a side surface corresponding to the channel 45. According to the foregoing descriptions, the bump 410' corresponds to the hole 510', so that when the limiting element 250 is inserted into the channel 45 to a predetermined depth, the bump 410' is capable of protruding through the hole 510'. Therefore, through matching between the bump 410' and the hole 510', the frame 200 is more firmly and precisely positioned or clamped and fastened on the back bezel 100. However, the foregoing is merely an example, and a corresponding structure configured to assist in positioning the frame 200 on the back bezel 100 according to various embodiments of the present invention is not limited thereto.

Figure 13:
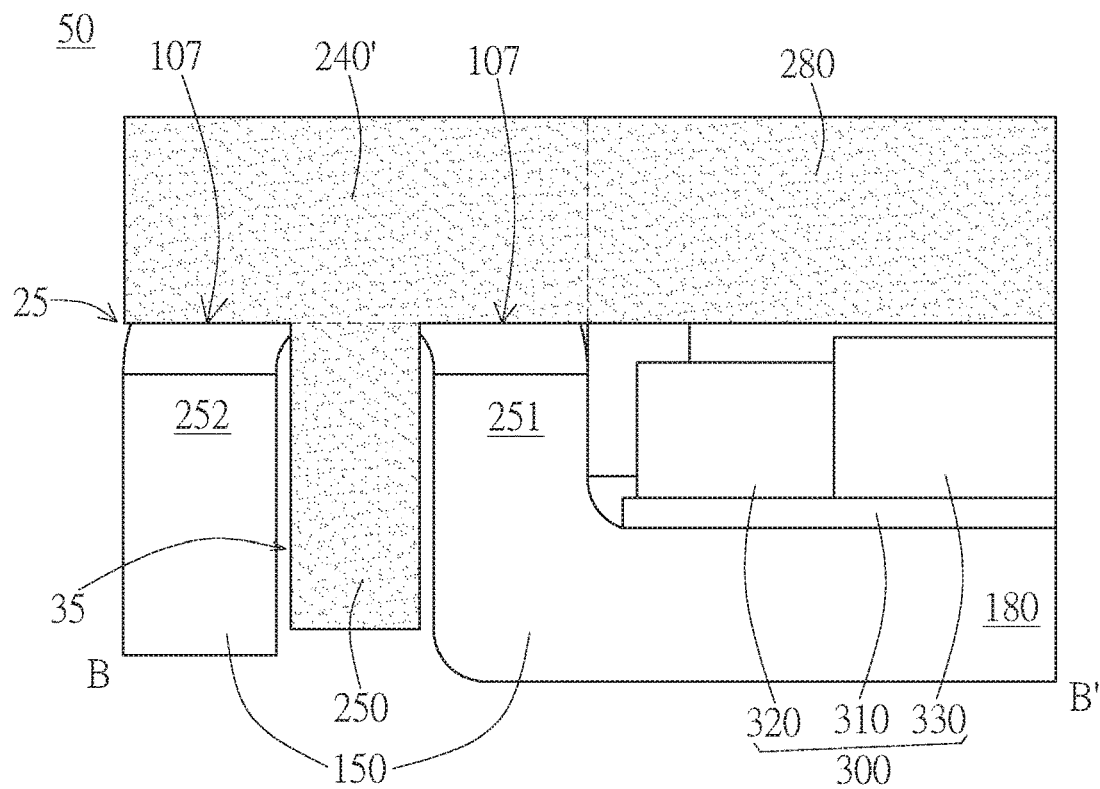
FIG. 13 is a schematic sectional view of the backlight module provided with a light source module.

According to some embodiments of the present invention, referring to FIG. 13 in conjunction with FIG. 12, similar to the foregoing backlight module 10, the backlight module 50 may further include the light source module 300. Specifically, the back bezel 100 of the backlight module 50 is provided with the base plate 180. The wall 150 may protrude from the base plate 180. The light source module 300 is close to the interior of the back bezel 100 more than the inner wall 251 and is disposed on the base plate 180 along the first side S1. According to the foregoing descriptions, due to shielding and separation of the inner wall 251, light emitted by the light emitting element 320 of the light source module 300 is not emitted and leaked along a direction toward the outer wall 252.

In addition, when the light source module 300 is disposed, the frame 200 of the backlight module 50 may further include the light shielding plate 280 extending and protruding toward the interior of the back bezel 100. In detail, the light shielding plate 280 may be connected to the top plate frame body 240', and is integrally formed with the top plate frame body 240' to extend and protrude toward the interior of the back bezel 100, so that when the light shielding plate 280 is orthogonally projected on the base plate 180, the light shielding plate 280 overlaps at least a part of the light source module 300. However, the foregoing is merely an example. The present invention is not limited thereto, and the aspect shown herein is merely an example. For example, according to another embodiment, the frame 200 of the backlight module 50 may also be additionally provided with the light shielding plate 280 that extends and protrudes toward the interior of the back bezel 100 and is separated from the top plate frame body 240' or is not on the same plane as the top plate frame body 240'.

In conclusion, according to the embodiments of the present invention, assembly precision can be increased, and reworkability of the assembly completed backlight module can be improved while the structure of the backlight module is simplified. In addition, according to the backlight modules provided in the embodiments of the present invention, the accommodation space of the backlight module can be further improved.

The foregoing descriptions are only some preferred embodiments of the present invention. It should be noted that, various changes and modifications may be made to the present invention without departing from the spirit and principle of the present invention. It should be understood by a person of ordinary skills in the technical field to which the present invention belongs that, the present invention is defined by the appended claims, and provided that the intent of the present invention is met, various possible variations such as replacements, combinations, modifications, and diversions all do not exceed beyond the scope defined by the appended claims of the present invention.

LIST OF REFERENCE NUMERALS

10, 20, 30, 40, 50: Backlight module
25: Fracture
35: Slot
45: Channel
100: Back bezel
102: Inner side surface
104: Outer side surface
105: Base
107: Top surface
110: First wall portion
115: Connection portion
120: Second wall portion
125: Lower end edge
150: Wall
151: Main wall portion
152: Inward concave wall portion
153: Connection portion
155: Alignment protrusion portion
180: Base plate
200, 201, 202: Frame
210: First frame wall
220: Second frame wall
230: Main frame wall
235: Notch
240: Top plate
240': Top plate frame body
241: Inner frame wall
242: Outer frame wall
250: Limiting element
251: Inner wall
252: Outer wall
280: Light shielding plate
300: Light source module
310: Circuit substrate
320: Light emitting element
330: Light guide plate
410: First bump
410': Bump
510: First hole
510': hole
610: First groove
620: Second groove
700: Tool
810: Reflector sheet
820: Optical film
900: Display module
920: PCBA
S1: First side
G, G': Trench
g: Gap

What is claimed is:

1. A backlight module, comprising:
a back bezel, provided with a wall disposed along a first side of the back bezel, wherein the wall is provided with a first wall portion and a second wall portion alternately arranged along the first side, the first wall portion and the second wall portion are each provided with an inner side surface and an outer side surface opposite to the inner side surface, and the inner side surface of the second wall portion protrudes toward the interior of the back bezel more than the inner side surface of the first wall portion; and
a frame, extending at least partially along the first side and positioned on the wall, wherein the frame is provided with a first frame wall and a second frame wall alternately arranged and protruding toward a base of the wall,
wherein the first frame wall correspondingly abuts against the inner side surface of the first wall portion, and the second frame wall correspondingly abuts against the outer side surface of the second wall portion.

2. The backlight module according to claim 1, wherein the outer side surface of the first wall portion of the back bezel protrudes away from the interior of the back bezel more than the outer side surface of the second wall portion.

3. The backlight module according to claim 1, further comprising a light source module, wherein the back bezel is provided with a base plate, and the wall protrudes from the base plate; and
wherein the light source module is disposed on the base plate along the first side at the side of the inner side surface of the first wall portion and the inner side surface of the second wall portion.

4. The backlight module according to claim 3, wherein the frame further comprises a light shielding plate extending and protruding toward the interior of the back bezel, and the light shielding plate overlaps at least a part of the light source module when the light shielding plate is orthogonally projected on the base plate.

5. The backlight module according to claim 3, wherein the light source module is provided with a circuit substrate, a gap exists between a lower end edge of the second wall portion and the base plate, and at least a part of the circuit substrate extends into the gap.

6. The backlight module according to claim 3, wherein the light source module is provided with a light emitting element, and when the light emitting element is orthogonally projected on the wall, the light emitting element at least overlaps a part of the base of the wall corresponding to the first wall portion.

7. The backlight module according to claim 1, wherein the frame is further provided with a top plate covering at least a part of a top surface of the wall, and the first frame wall and the second frame wall each protrude toward the base of the wall from the top plate,
wherein the top plate is provided with a notch along an end edge of an end of the first side, and the wall is provided with an alignment protrusion portion corresponding to the notch and protruding toward the notch.

8. The backlight module according to claim 1, wherein one of the first frame wall and the first wall portion is provided with a first bump protruding toward the other one of the first frame wall and the first wall portion, and the other one of the first frame wall and the first wall portion is provided with a first hole corresponding to the first bump, so that when the first frame wall correspondingly abuts against the inner side surface of the first wall portion, the first bump protrudes through the first hole.

9. The backlight module according to claim 1, wherein the frame is further provided with a top plate covering at least a part of a top surface of the wall, and a main frame wall close to the interior of the back bezel more than the first frame wall and the second frame wall, wherein the main frame wall, the first frame wall, and the second frame wall each protrude toward the base of the wall from the top plate,
wherein the main frame wall, the top plate, and the second frame wall delimit a trench together, and the second wall portion is inserted into the trench, so that the second wall portion is sleeved with the main frame wall, the top plate, and the second frame wall.

10. The backlight module according to claim 1, wherein the wall is further provided with a connection portion, and the connection portion connects the first wall portion and the second wall portion.

11. A backlight module, comprising:
a back bezel, provided with a wall disposed along a first side of the back bezel, wherein the wall is provided with an inner side surface and an outer side surface opposite to the inner side surface, and the wall is provided with a plurality of first grooves recessed from the inner side surface and a plurality of second grooves recessed from the outer side surface that are alternately arranged along the first side; and
a frame, extending at least partially along the first side and positioned on the wall, wherein the frame is provided with a first frame wall and a second frame wall alternately arranged and protruding toward a base of the wall,
wherein the first frame wall is correspondingly inserted into the first groove, and the second frame wall is correspondingly inserted into the second groove.

* * * * *